United States Patent
Lee et al.

(10) Patent No.: US 11,341,596 B2
(45) Date of Patent: May 24, 2022

(54) ROBOT AND METHOD FOR CORRECTING POSITION OF SAME

(71) Applicant: LG ELECTRONICS INC., Seoul (KR)

(72) Inventors: Donghak Lee, Seoul (KR); Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 16/860,798

(22) Filed: Apr. 28, 2020

(65) Prior Publication Data

US 2021/0118086 A1    Apr. 22, 2021

(30) Foreign Application Priority Data

Oct. 16, 2019    (KR) ........................ 10-2019-0128476

(51) Int. Cl.
| | |
|---|---|
| *G06T 7/00* | (2017.01) |
| *G06T 1/00* | (2006.01) |
| *G01S 19/01* | (2010.01) |
| *G01B 11/22* | (2006.01) |
| *G06N 3/04* | (2006.01) |
| *G06T 7/73* | (2017.01) |
| *G06N 3/08* | (2006.01) |

(52) U.S. Cl.
CPC ............ *G06T 1/0014* (2013.01); *G01B 11/22* (2013.01); *G01S 19/01* (2013.01); *G06N 3/04* (2013.01); *G06N 3/08* (2013.01); *G06T 7/75* (2017.01); *G06T 2207/20081* (2013.01); *G06T 2207/20084* (2013.01)

(58) Field of Classification Search
CPC .................. G06T 1/0014; G06T 7/75; G06T 2207/20081; G06T 2207/20084; G06T 7/74; G01B 11/22; G01S 19/01; G01S 19/485; G06N 3/04; G06N 3/08; G06N 3/0454; B25J 9/1692; B25J 9/161; B25J 9/1679; B25J 9/1697; B25J 11/008; B25J 19/02
See application file for complete search history.

(56) References Cited

U.S. PATENT DOCUMENTS

| | | | |
|---|---|---|---|
| 11,046,430 B1* | 6/2021 | Melton | ................... G05D 1/101 |
| 2020/0066036 A1* | 2/2020 | Choi | .......................... G06T 7/75 |

FOREIGN PATENT DOCUMENTS

| | | | | |
|---|---|---|---|---|
| WO | WO-2020091262 A1 * | 5/2020 | ............. | H04N 5/232 |

\* cited by examiner

*Primary Examiner* — Ping Y Hsieh
(74) *Attorney, Agent, or Firm* — Birch, Stewart, Kolasch & Birch, LLP

(57) ABSTRACT

A robot can include a position measuring sensor to measure a position of the robot as the robot moves in an outdoor space; a camera to acquire an image of surroundings of the robot; a memory configured to store place information including positions and appearance feature information of a plurality of places existing in the outdoor space; and at least one processor to extract one or more appearance features of M first places in the image, where M is an integer greater than or equal to 1, select one or more positions of N second places from the place information stored in the memory based on the one or more appearance features of the M first places in the image, where N is an integer greater than or equal to 1 and less than or equal to M, and generate a corrected position for the robot.

20 Claims, 9 Drawing Sheets

FIG. 5

| Place | Position (longitude, latitude) | Store-name information |
|---|---|---|
| $a_1$ | 37.499568, 127.027565 | Hospital A |
| $a_2$ | 37.498585, 127.028739 | Restaurant B |
| $a_3$ | 37.495484, 127.027728 | Café C |
| $a_4$ | 37.495761, 127.027524 | Convenience store D |
| $a_5$ | 37.499068, 127.025992 | Drugstore E |
| ⋮ | ⋮ | ⋮ |
| $a_b$ | 37.497312, 127.029346 | Café F |

ROBOT AND METHOD FOR CORRECTING POSITION OF SAME

CROSS-REFERENCE TO RELATED APPLICATION

This application claims priority to and the benefit of Korean Patent Application No. 10-2019-0128476, filed in the Republic of Korea on Oct. 16, 2019, where the entirety of this application is incorporated herein by reference into the present application.

BACKGROUND

1. Field

The present disclosure relates to a robot and a method for correcting a position of the robot.

2. Background

Robots have been developed for industrial purposes and have played a role in automating processes in factories. In recent years, robots have been applied to a wide range of fields. Accordingly, medical robots, aerospace robots and the like including domestic robots used in homes have been developed. Among the robots, a robot capable of navigating automatically is referred to as a mobile robot.

As more and more robots are used in various fields, there is a growing demand for a robot that can offer various types of information, amusement and services as well as a robot that can repeatedly perform simple functions. Accordingly, research has been conducted into various types of robots, which can provide convenience to users at homes, restaurants, stores, public places and the like.

In particular, mobile robots can be used to deliver products to customers. In this situation, the mobile robots may be provided with a camera and a plurality of sensors, and a navigation path may be set for the mobile robots based on images acquired by the camera and various types of sensing information acquired by the plurality of sensors. In this process, the mobile robots may store information on objects placed in a space or on the structure of a space on a map and may set a navigation path by further using the map.

Additionally, the mobile robots may be provided with a GPS module, and positions of the mobile robots may be measured with the GPS module. However, the GPS module may not accurately measure the positions of the mobile robots for the reason that the GPS module is a relatively low-priced device or due to an environmental factor. In this situation, a mobile robot may collide with a vehicle navigating in an outdoor space because the position of the mobile robot is not accurately measured.

SUMMARY

The present disclosure is directed to a method for correcting a position of a robot, by which an error in a measured position of the robot moving in an outdoor space may be accurately corrected, and to a robot which may implement the method.

Additionally, the present disclosure is directed to a method for correcting a position of a robot, by which information on a surrounding major place applied in a web map is registered on a map of the robot and by which, when the robot finds out the major place, a position of the robot may be corrected using the registered place information, and to a robot which may implement the method.

Objectives of the present disclosure are not limited to the above-mentioned ones, and other objectives and advantages of the disclosure, which are not mentioned above, can be clearly understood from the following description and can be more clearly understood from embodiments of the disclosure. Further, it can be easily understood that the objectives and advantages of the disclosure may be implemented by means described in the appended claims and combinations thereof.

An example robot includes a position measuring sensor that measures a position of the robot which moves in an outdoor space, a camera that acquires images of surroundings of the robot, a memory that stores place information including a position and an appearance feature of each of a plurality of places in the outdoor space and that stores one or more instructions, and a processor that corrects the measured position by executing the one or more instructions, where the processor analyzes the acquired image and extracts appearance features of M (integers of 1 or greater) first places in the acquired image, selects positions of N (integers of 1 or greater and less than M) second places in the place information using the appearance features of the M first places, and corrects the measured position of the robot based on the positions of the N second places.

Additionally, an example robot includes a position measuring sensor that measures a position of the robot which moves in an outdoor space, a camera that acquires images of surroundings of the robot, a memory that stores one or more instructions, and a processor that corrects the measured position by executing the one or more instructions, where the processor extracts an appearance feature of a first place in the acquired image based on the acquired image, selects a position of a second place having the same appearance feature as the appearance feature of the first place from pre-acquired place information and corrects the measured position of the robot based on the position of the second place, and where the place information may include a position and an appearance feature of each of a plurality of places in the outdoor space.

An example method for correcting a position of a robot includes a position measuring sensor's measuring a position of a robot moving in an outdoor space, a camera's acquiring an image of a surrounding environment of the robot, a processor's analyzing the acquired image and extracting appearance features of M (integers of 1 or greater) first places in the acquired image, the processor's selecting positions of N (integers of 1 or greater) second places having the same appearance features as at least part of the appearance features of the M first places from pre-acquired place information and correcting the measured position of the robot based on the positions of the N second places, wherein the place information includes a position and an appearance feature of each of a plurality of places in the outdoor space.

The present disclosure may accurately correct an error in a measured position of a robot which moves in an outdoor space.

Additionally, the present disclosure may register information on an adjacent major place applied to a web map on a map of the robot, and, when the robot finds out the major place, may correct a position of the robot using the registered place information.

Detailed effects of the present disclosure are described together with the above-described effects in the detailed description of the disclosure.

BRIEF DESCRIPTION OF THE DRAWINGS

Arrangements and embodiments will be described in detail with reference to the following drawings in which like reference numerals refer to like elements, and wherein:

FIG. 5 is diagram illustrating an example of text-type place information according to an embodiment of the present disclosure.

DETAILED DESCRIPTION OF THE EMBODIMENTS

Figure 1:
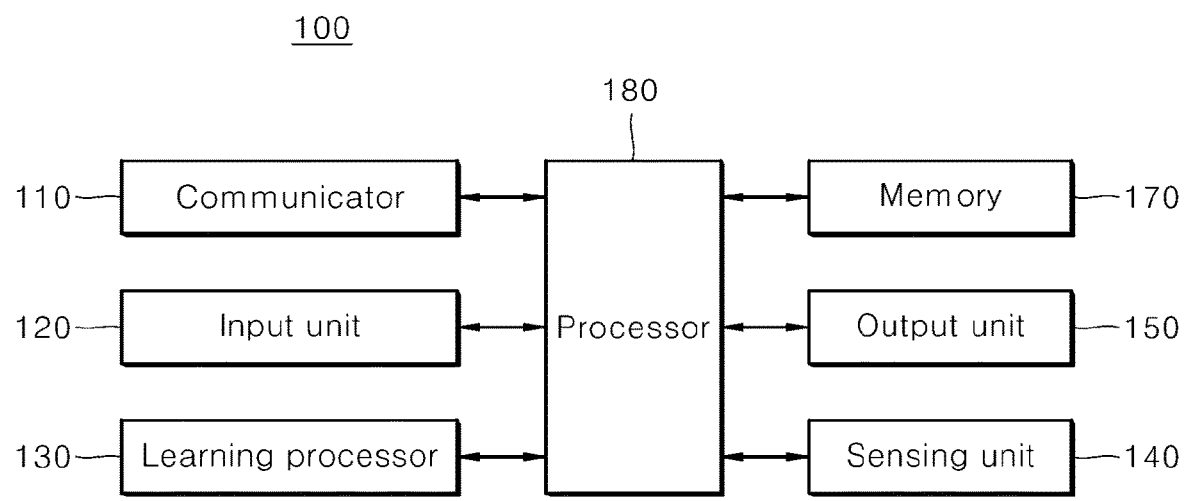
FIG. 1 is a schematic view illustrating a configuration of an AI device according to an embodiment of the present disclosure.

The above-described objectives, features and advantages are specifically described with reference to the attached drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are described with reference to the accompanying drawings. Throughout the drawings, identical reference numerals denote identical or similar components.

In describing components of the present disclosure, terms such as first, second, A, B, (a), (b), and the like may be used. These terms are only intended to distinguish a component from another component, and the components are not limited to such terms. Certainly, unless explicitly stated otherwise, a first component may denote a second component.

When a component is described as being "connected," "coupled" or "connected" to another component, the component may be directly connected or able to be connected to another component; however, it is also to be understood that an additional component may be "interposed" between the two components, or the two components may be "connected," "coupled" or "connected" through an additional component.

Throughout the specification, the term "A and/or B" may denote A, B or A and B, unless explicitly indicated otherwise, and the term "C to D" may denote C or greater and D or less, unless explicitly indicated otherwise.

Throughout the specification, a singular form of each component is intended to include its plural form as well, unless explicitly indicated otherwise.

Throughout the specification, the singular forms "a," "an" and "the" are intended to include their plural forms as well, unless explicitly indicated otherwise. It will be further understood that the term "comprise" or "include," when used in this specification, should not be interpreted as necessarily including stated components, or steps but may be interpreted as including some of the stated components or steps or should be interpreted as further including additional components or steps.

In implementing the disclosure, components can be segmented and described for convenience. However, the components may be implemented in one device or module, or one component may be divided and implemented into two or more devices or modules.

Below, in this specification, a device that moves in specific areas while performing specific functions is totally referred to as a robot. Functions performed by a robot involve a variety of functions such as cleaning, delivery, guiding and drawing up of a map and the like that can be performed by a movable device. For convenience of description, suppose that the robot described in this specification is a robot for physical distribution, e.g., a delivery robot.

FIG. 1 is a schematic view illustrating a configuration of an exemplary AI device 100.

The AI device 100 may be implemented as a fixed device or a movable device and the like such as a TV set, a projector, a mobile phone, a smart phone, a desktop computer, a laptop, a digital broadcasting terminal, a personal digital assistant (PDA), a portable multimedia player (PMP), a navigator, a tablet PC, a wearable device, a set-top box (STB), a DMB receiver, a radio, a washer, a refrigerator, digital signage, a robot, a vehicle and the like.

Referring to FIG. 1, the AI device 100 may include a communicator 110, an input unit 120, a learning processor 130, a sensing unit 140, an output unit 150, a memory 170, a processor 180, and the like.

The communicator 110 may transmit data to and receive data from another AI device or external devices such as a below-described AI server 200 and the like, using wired and wireless communication technologies.

For example, the communicator 110 may transmit sensing information, user input, learning models, control signals and the like to external devices and may receive the same from the external devices.

In this situation, the communicator 110 may use Global System for Mobile Communication (GSM), Code Division Multi Access (CDMA), Long Term Evolution (LTE), 5G, Wireless LAN (WLAN), Wireless-Fidelity (Wi-Fi), Bluetooth, Radio Frequency Identification (RFID), Infrared Data Association (IrDA), ZigBee, Near Field Communication (NFC), and the like, as communication technologies.

The input unit 120 may acquire various types of data.

In this situation, the input unit 120 may include a camera for inputting image signals, a microphone for receiving audio signals, and a user input unit for receiving information input by a user and the like. Herein, the camera or the microphone may be considered a sensor, and signals acquired from the camera or the microphone may be considered sensing data or sensing information.

The input unit 120 may acquire input data and the like that will be used when acquiring an output with training data and learning models for model learning. The input unit 120 may also acquire raw input data, and, in this situation, the processor 180 or the learning processor 130 may extract input features as pre-processing of input data.

The learning processor 130 may train a model comprised of artificial neural networks using training data.

A learned artificial neural network may be referred to as a learning model. The learning model may be used to infer result values for new input data not for training data, and the inferred values may be used as a basis for determination to perform a certain operation.

In this situation, the learning processor 130 may perform AI processing together with a learning processor 240 of the AI server 200.

The learning processor 130 may include a memory integrated into or implemented in the AI device 100, or may be implemented using a memory 170, an external memory directly coupled to the AI device 100 or a memory maintained in an external device.

The sensing unit 140 may acquire at least one of internal information on the AI device 100, surrounding environment information on the AI device 100 and user information using various sensors.

In this situation, the sensing unit 140 may include sensors such as a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LiDAR sensor, a radar sensor and the like.

The output unit 150 may generate an output concerning senses of sight, hearing or touch and the like.

In this situation, the output unit 150 may include a display unit outputting visual information, a speaker outputting acoustic information, a haptic module outputting tactile information and the like.

The memory 170 may store data that assists with various functions of the AI device 100. For example, the memory 170 may store input data, training data, learning models, learning history and the like, acquired by the input unit 120.

The processor 180 may determine at least one viable operation of the AI device 100 based on information determined or generated using an algorithm for data analysis or a machine learning algorithm. Additionally, the processor 180 may perform the determined operation by controlling components of the AI device 100.

To this end, the processor 180 may request, search, receive or use data of the learning processor 130 or the memory 170, and may control the components of the AI device 100 to perform a predictable operation or an operation considered to be desirable among one or more viable operations.

In this situation, the processor 180 may generate control signals for controlling an external device and may transmit the generated control signals to the external device when the processor 180 is required to connect with the external device to perform the determined operation.

The processor 180 may acquire intention information on user input, and, based on the acquired intention information, may determine requirements of the user.

In this situation, the processor 180 may acquire intention information corresponding to the user input, using at least one or more of a speech-to-text (STT) engine for converting an input voice into a character string, or a natural language processing (NLP) engine for acquiring intention information on natural language.

At least one of the STT engine or the NLP engine may be comprised of artificial neural networks trained according to a machine learning algorithm. Additionally, at least one of the STT engine or the NLP engine may be an engine trained by the learning processor 130, by the learning processor 240 of the AI server 200, or by distributed data processing thereof.

The processor 180 may collect history information including a user's feedback and the like on details of operations of the AI device 100 or on operations of the AI device 100 and may store the history information in the memory 170 or the learning processor 130, or may transmit the history information to an external device such as the AI server 200 and the like. The collected history information may be used to update a learning model.

The processor 180 may control at least part of the components of the AI device 100 to drive an application program stored in the memory 170. Further, the processor 180 may operate two or more of the components included in the AI device 100 by combining the two or more components to drive an application program.

Figure 2:
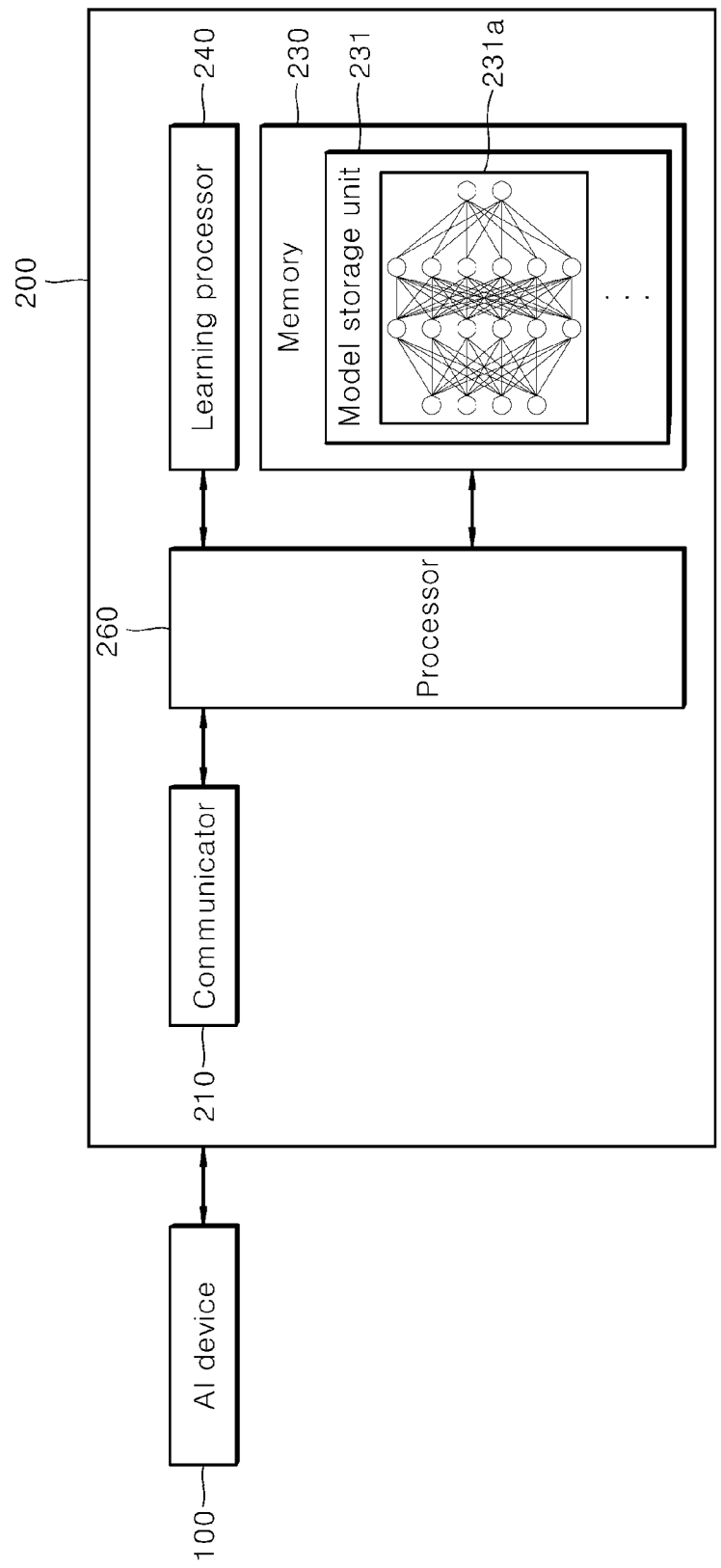
FIG. 2 is a schematic view illustrating a configuration of an AI server according to an embodiment of the present disclosure.

FIG. 2 is a schematic view illustrating a configuration of an AI server 200 according to an embodiment.

Referring to FIG. 2, the AI server 200 may denote a device that trains an artificial neural network using a machine learning algorithm or a device that uses a trained artificial neural network.

The AI server 200 may be comprised of a plurality of servers to perform distributed data processing, and may be defined as a 5G network. In this situation, the AI server 200 may be included in the AI device 100 as a component and may perform at least part of AI processing together with the AI device 100.

The AI server 200 may include a communicator 210, a memory 230, a learning processor 240 and a processor 260 and the like.

The communicator 210 may transmit data to and receive data from an external device such as the AI device 100 and the like.

The memory 230 may include a model storage unit 231. The model storage unit 231 may store a model (or an artificial neural network, 231a) that is being trained or is trained through the learning processor 240.

The learning processor 240 may train the artificial neural network 231a using training data. A learning model may be used in the state of being mounted onto the AI server 200 of an artificial neural network or may be used in the state of being mounted on an external device such as the AI device 100 and the like.

The learning model may be implemented as hardware, software, or a combination of hardware and software. When all or part of the learning model is implemented as software, one or more instructions constituting the learning model may be stored in the memory 230.

The processor 260 may infer result values with respect to new input data using the learning model, and may generate responses or control instructions based on the inferred result values.

The above-described AI device 210 and AI server 220 may be applied to details that are provided hereunder in the present disclosure, and may be supplemented to specify or clarify technical features of methods presented in the present disclosure.

Figure 3:
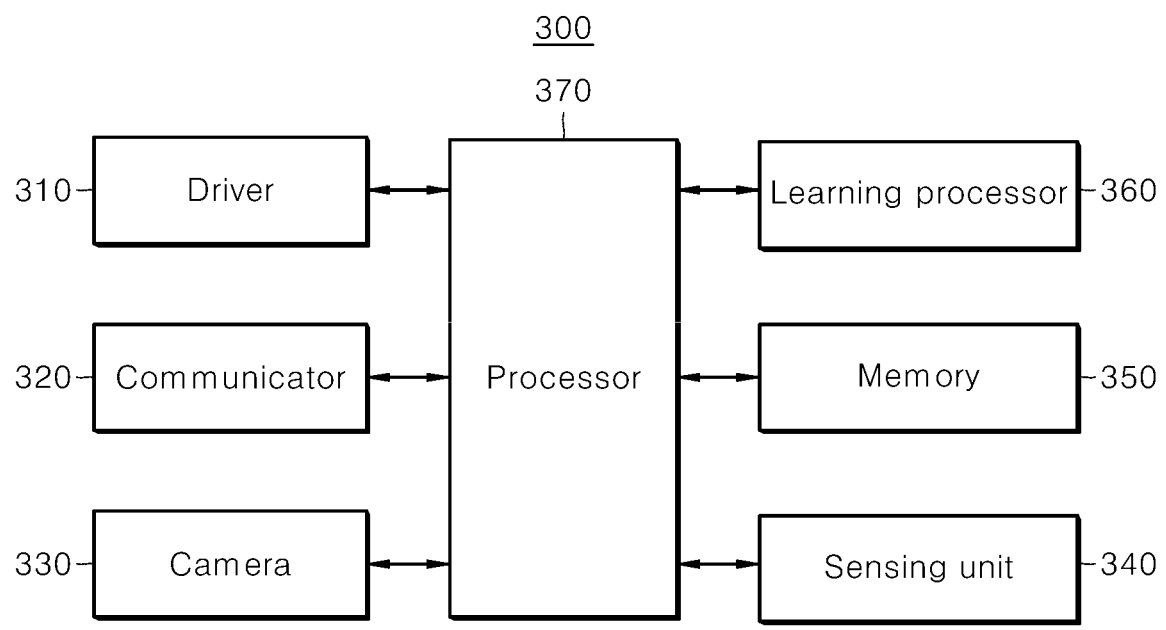
FIG. 3 is a schematic view illustrating a configuration of a robot according to an embodiment of the present disclosure.

FIG. 3 is a schematic view illustrating a configuration of an exemplary robot.

Referring to FIG. 3, the exemplary robot 300, as described above, may be a movable robot used for physical distribution, and may include a driver 310, a communicator 320, a camera 330, a sensing unit 340, a memory 350, a learning processor 360, and a processor 370.

Below, functions of each component are described.

The driver 310 includes an actuator, a motor and the like, and moves the robot 300.

The communicator 320 communicates with an external device. In this situation, the communicator 320 may include a mobile communication module, a short-range communication module and the like.

The mobile communication module may perform communication using technical standards or communication methods for mobile communication. The technical standards or communication methods may include Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G networks and the like.

The short-range communication module, which is used for short-range communication, may include at least one of the technologies including Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB).

The camera 330 acquires images of a surrounding environment of the robot 300.

The sensing unit 340 acquires surrounding environment information and the like on the robot 300 using various sensors.

For example, the sensing unit 340 may include sensors such as a proximity sensor, an illumination sensor, a touch sensor, an acceleration sensor, a magnetic sensor, a G-sensor, a gyroscope sensor, a motion sensor, an RGB sensor, an infrared sensor, an ultrasonic sensor, an optical sensor, a LiDAR sensor, a radar sensor and the like.

The sensing unit 340 may include a position measuring sensor that measures a position of the robot 300. For example, the position measuring sensor may be a GPS sensor or a GLONASS sensor. In this situation, the position is defined by a longitude and a latitude.

Additionally, the sensing unit 340 may include a depth sensor. The depth sensor acquires a depth image of a specific area.

Specifically, the depth sensor is a device that measures a depth of a scene, i.e., a distance between sensor and an object and outputs the distance as an image. The depth sensor acquires a depth image of a scene using time-of-flight (TOF) technology. The TOF technology is a method by which time taken by an infrared signal to reflect from an object in a scene to be photographed and by the infrared signal to return is measured. Depth information of the scene acquired with the TOF technology is expressed as a depth image through quantization.

The memory 350 may be volatile and/or non-volatile memory, and may store an instruction or data in relation to at least one of other components of the robot 300. Specifically, the memory 350 stores an artificial neural network-based algorithm model used to correct a measured position of the robot 300. Additionally, the memory 350 may store place information used to correct the measured position. The place information may include a position and an appearance feature of each of a plurality of places in an outdoor space (the outside). Detailed description in relation to this is provided hereunder.

The learning processor 360 performs the function of learning the artificial neural network-based algorithm model.

The processor 370 may include one or more of a central processing unit, an application processor or a communication processor. For example, the processor 370 may perform calculation or data processing in relation to control and/or communication of at least one of other components of the robot 300. Specifically, the processor 370 may execute an instruction in relation to execution of a computer program, and may correct a measured position of the robot 300 using the artificial neural network-based model.

Below, the artificial neural network-based algorithm is briefly described, and then an exemplary method for correcting a position of the robot 300 is described.

Artificial intelligence involves an area that studies artificial intelligence or methodologies of developing artificial intelligence, and machine learning involves an area that defines a variety of problems handled in the artificial intelligence field and that studies methodologies of solving the problems. Machine learning is also defined as an algorithm for enhancing performance concerning a job through steady experience.

An artificial neural network (ANN), which is a model used in machine learning, may denote a model that is comprised of artificial neurons (nodes) forming a network through a connection of synapses and that has the ability to solve problems, as a whole. The artificial neural network may be defined by a pattern of a connection between neurons of another layer, a learning process of updating model parameters, and an activation function generating an output value.

The artificial neural network may include an input layer, an output layer, and optionally one or more hidden layers. Each layer may include one or more neurons, and the artificial neural network may include synapses connecting a neuron and a neuron. In the artificial neural network, each neuron may output input signals input through synapses, weights, and values of an activation function of biases.

A model parameter may denote a parameter determined through learning, and may include weights of connections of synapses, biases of neurons, and the like. Additionally, a hyperparameter denotes a parameter that is required to be set prior to learning in a machine learning algorithm, and includes a learning rate, repetition frequency, a size of mini-batch, an initialization function, and the like.

The purpose of learning an artificial neural network is to determine a model parameter that minimizes a loss function. The loss function may be used as an index for determining an optimal model parameter in the process of learning the artificial neural network.

Machine learning may be classified as supervised learning, unsupervised learning, and reinforcement learning based on learning methods.

Supervised learning may involve a method of training an artificial neural network in the state in which a label is given to training data, and a label may denote the correct answer (or result values) that has to be inferred by an artificial neural network when training data is input to the artificial neural network.

Unsupervised learning may involve a method of training an artificial neural network in the state in which a label is not given to training data.

Reinforcement learning may involve a training method of training an agent defined in a certain environment such that the agent chooses a behavior for maximizing a cumulative reward or the order of behaviors for maximizing a cumulative reward in each state.

Among artificial neural networks, machine learning implemented as a deep neural network (DNN) including a plurality of hidden layers is also referred to as deep learning, and deep learning is part of machine learning. Below, machine learning includes deep learning.

Figure 4:
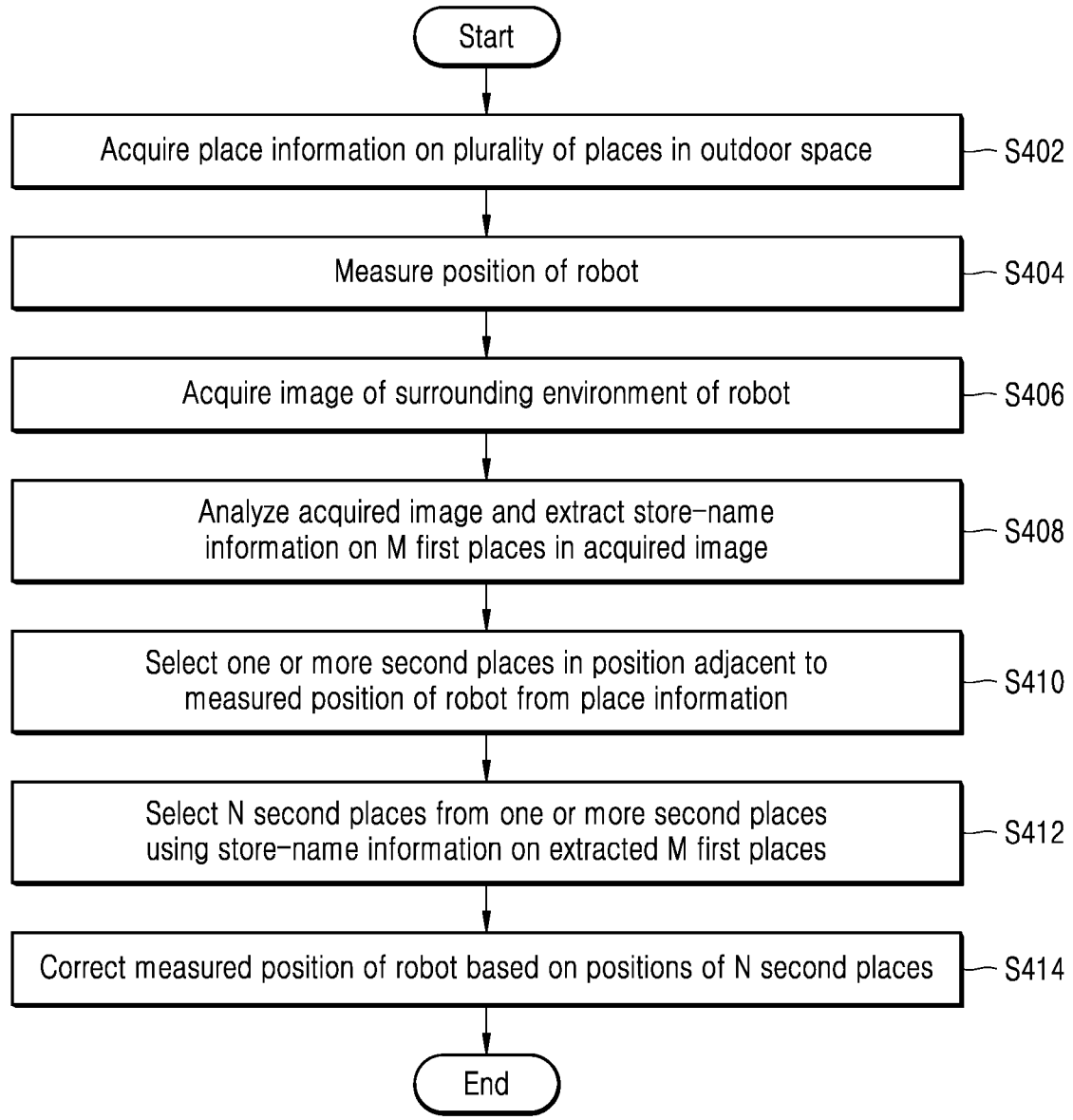
FIGS. 4 and 8 are a flow chart illustrating a method for correcting a position of a robot according to an embodiment of the present disclosure.

FIG. 4 is a flow chart illustrating a method for correcting a position of an exemplary robot 300.

Herein, suppose that the robot 300 moves in an outdoor space (the outside).

Below, operations in each step are described.

First, in step 402, place information on a plurality of places in an outdoor space is acquired. In this situation, each of the plurality of places corresponds to a landmark that is set to correct a measured position of the robot 300.

For example, the place information may be received by an external server and the like through the communicator 310, or may be input by a user through a user interface, and acquired place information may be stored in the memory 350.

The place information includes a position and an appearance feature of each of the plurality of places.

The position may be defined as a latitude and a longitude and may correspond to GPS position information.

The appearance feature may correspond to a feature of a shape of a place. Preferably, the appearance feature may be store-name information displayed on a structure placed outside a place, specifically, on a sign structure. In the place information, the appearance feature may be displayed in the form of a picture or a text.

Below, for convenience of description, "store-name information" is provided as an example of "appearance feature." However, the present disclosure is not limited.

FIG. 5 illustrates an example of text-type place information. Referring to FIG. 5, the text-type place information may include an index, and a position defined as a longitude and a latitude, and store-name information of a place.

In an embodiment, the place information may be generated using a web map containing positions and store-name information regarding a plurality of places. A user may generate place information on an area in which the robot 300 moves, based on the web map, and may register the place information in the robot 300.

The web map includes a first web map that is comprised of pictures such as a road view, a street view and the like, and a second web map that includes store-name information in the form of an ordinary map.

Figure 6:
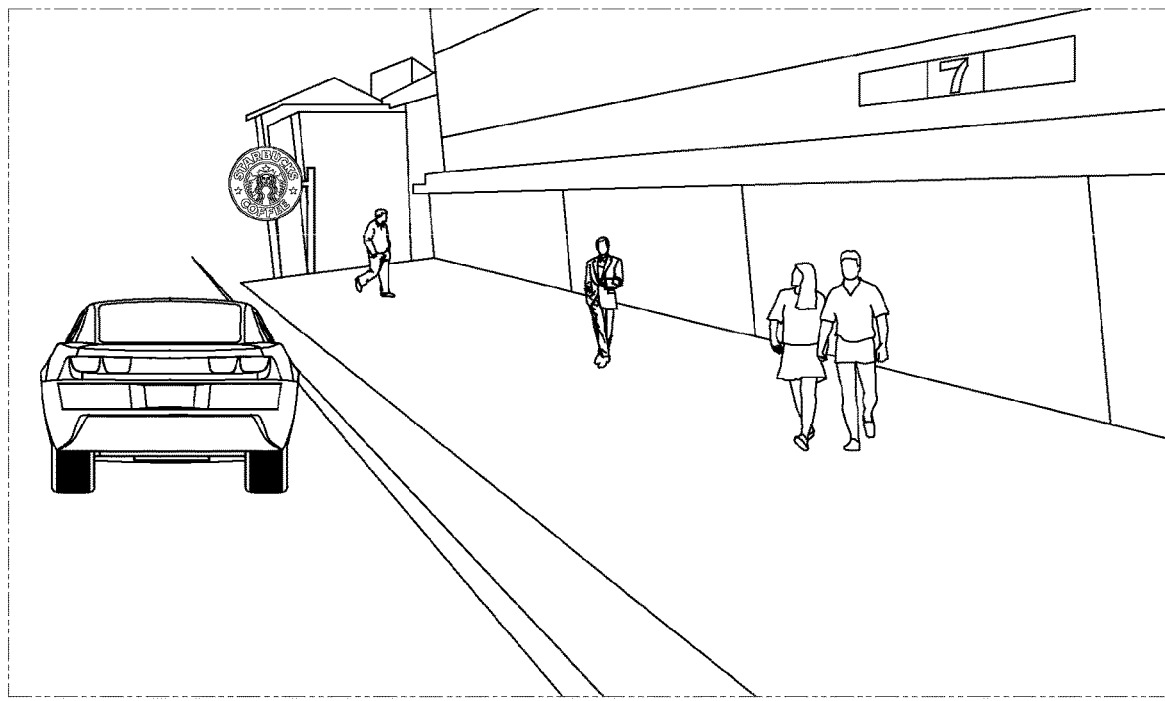
FIG. 6 is a view illustrating an example of the first web map according to an embodiment of the present disclosure.

FIG. 6 is a view illustrating an example of the first web map. Referring to FIG. 6, pictures in relation to external shapes of various places are displayed on the first web map (e.g., a street view map). When a specific place is selected, a position (a longitude and a latitude) corresponding to the selected place may be displayed.

Figure 7:
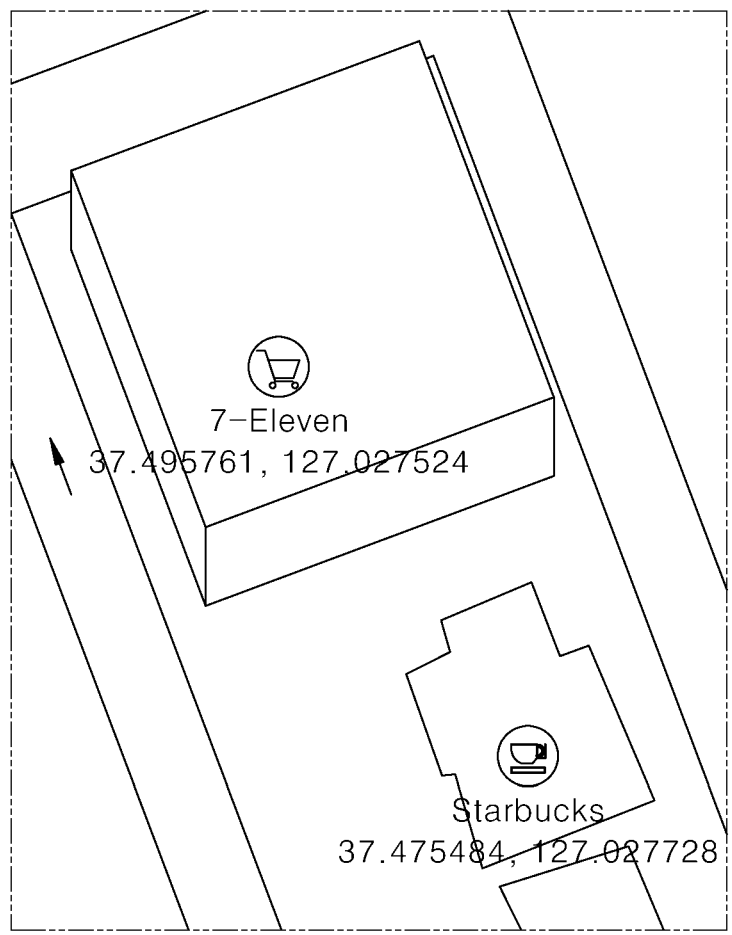
FIG. 7 is a view illustrating an example of the second web map according to an embodiment of the present disclosure.

FIG. 7 is a view illustrating an example of the second web map (e.g., an aerial view or 3D view map). Referring to FIG. 7, store-name information on various places may be displayed on the second web map. When a specific place is selected, a position (a longitude and a latitude) corresponding to the selected place may be displayed.

In summary, when the place information is provided in a text form, the second web map may be used for generation of place information, and when the place information is provided in a picture form and in a text form, the first web map and the second web map may all be used for generation of place information.

Next, in step 404, a position measuring sensor measures a position of the robot 300.

In this situation, the measured position of the robot 300 may not be an accurate position for the reason that the position measuring sensor is a relatively low-priced device, and the like. That is, a position of the robot 300, measured by the position measuring sensor, may not be the same as an actual position of the robot 300.

Next, in step 406, the camera 330 acquires images of a surrounding environment of the robot 300.

The acquired image may include external shapes of M (1 or more) places in a specific area. The image may include shapes of structures placed outside the M places. The structure may be a sign structure that displays store-name information on a place. A place included in the image is referred to as a "first place" for convenience.

For example, an image acquired by the camera 330 may be similar to the drawing in FIG. 6.

Step 404 and step 406 may be performed at the same time.

Then, in step 408, the processor 370 analyzes the acquired image and extracts store-name information on M first places in the acquired image.

In an embodiment, the processor 370 may extract store-name information on the M first places using a pre-learned artificial neural network-based algorithm model. For example, the algorithm model may be a convolutional neural network (CNN)-based algorithm model.

Referring to the above description of an artificial neural network, an algorithm model includes an input layer comprised of input nodes, an output layer comprised of output nodes, and one or more hidden layers placed between the input layer and the output layer and comprised of hidden nodes, and, through learning, weights of edges connecting the nodes and biases of the nodes are updated. Additionally, an image acquired by the camera 330 may be input to an input layer of a learned algorithm model and store-name information of the M first places may be output to an output layer of the learned algorithm model.

The learning processor 360 may perform learning of an algorithm model.

In an embodiment, the learning processor 360 may learn an algorithm model using a picture extracted from first web map as training data.

That is, the first web map is comprised of pictures, and the pictures include external shapes of a plurality of places, particularly, sign structures of the places. Accordingly, the learning processor 360 inputs a plurality of pictures extracted from first web map to an input layer of an algorithm model to perform learning procedures.

Next, in step 410, the processor 370 selects one or more places in a position adjacent to a measured position of the robot from the place information. Herein, the term "being adjacent" corresponds to the term "being within a preset radius with respect to the measured position of the robot 300."

When a place is a franchised store, there might be a place having the same store-name information in a different area. In this situation, the place may not be accurately searched. Accordingly, step 410 is a step performed to ensure accuracy of a search.

For example, referring to an example in FIG. 5, when a position of the robot 300, measured by the position measuring sensor, is 37.495688, 127.026643, the processor 370 may select café C and convenience store D from the place information considering the preset radius.

One or more searched places are referred to as "second place" for convenience.

Next, in step 412, the processor 370 selects N (integers of 1 or greater and M or less) second places from one or more pieces of the place information, using the store-name information on the M first places extracted in step 408.

Specifically, the processor 370 selects the N second places having the same store-name information as at least part of the M first places from the one or more second places. In this case, at least some of the first places may be N.

That is, the one or more second places are places registered as a landmark, and the extracted M first places may be places registered as a landmark or places not registered as a landmark. Accordingly, step 412 may be a step of confirming whether each of the extracted M first places is a registered landmark, and, in step 412, the N second places are selected through a comparison between appearance features of the one or more second places and appearance features of the M first places.

For example, three first places are extracted and, among the three first places, pieces of store-name information on two first places are the same as pieces of store-name information on two second places, the processor 370 selects the two second places.

Finally, in step 414, the processor 370 corrects a measured position of the robot, based on positions of the N second places.

Figure 8:
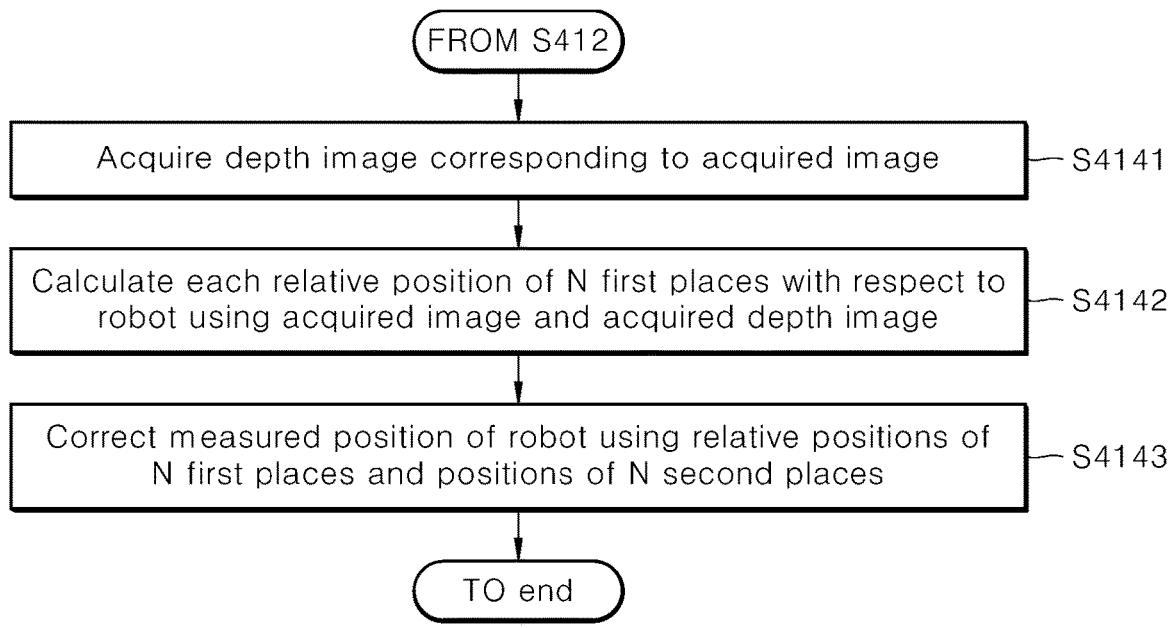

Below, operations in step 414 are described with reference to FIG. 8.

In step 4141, the depth sensor acquires a depth image corresponding to the acquired image.

In step 4142, the processor 370 calculates a relative position of each of the at least one first places (e.g., the N first places) with respect to the robot 300 using the acquired image and the acquired depth image.

Specifically, the processor 370 detects edges of sign structures of the N first places using the acquired image, and calculates central portions of the sign structures of the N first places using points where the edges are met. Additionally, the processor 370 calculates relative positions of the central portions of the sign structures of the N first places with respect to the robot 300 using the acquired depth data. In this situation, the relative positions of the central portions of the sign structures of the first places are relative positions of the first places.

The processor 370 may calculate the edges of the sign structures of the N first places, and, based on the edges of the sign structures of the N first places, may calculate vanishing points of the sign structures of the N first places. Additionally, the processor 370 may calculate relative angles of the sign structures of the N first places with respect to the robot 300, using the detected vanishing points. Based on the relative angles, a relative position of the robot 300 may be calculated more accurately. That is, the robot 300 may rotate by the calculated relative angles toward the sign structures of the first places, and the relative positions of the first places may be calculated more accurately.

Figure 9:
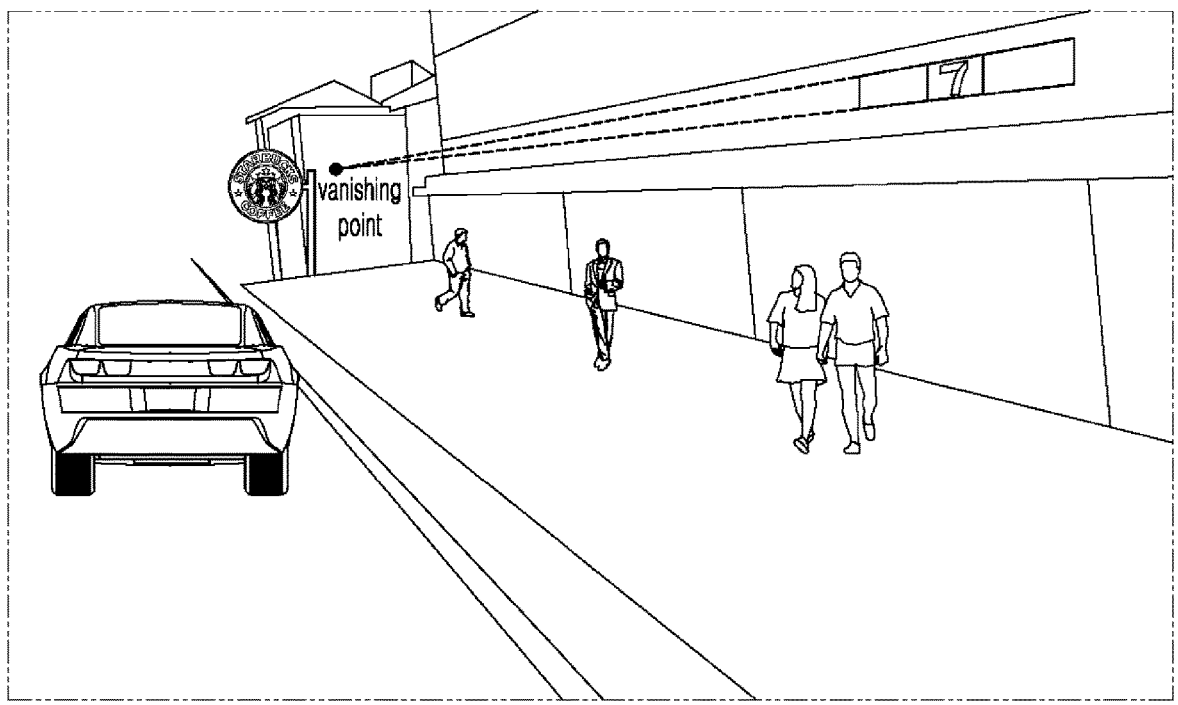
FIG. 9 is a diagram illustrating a concept of calculating a relative position of a place according to an embodiment of the present disclosure.

FIG. 9 is a view illustrating a concept of the above-described calculation process.

Then, in step 4143, the processor 370 corrects the measured position of the robot 300 using the relative positions of the N first places and the positions of the N second places.

Specifically, the processor 370 calculates N corrected positions, and corrects the measured position of the robot 300 by weighted sum the N the corrected positions.

In this situation, an i-numbered corrected position among the N the corrected positions is calculated based on a relative position of the robot 300 with respect to a position of an i-numbered second place among the N second places and with respect to a position of an i-numbered first place among the N first places. Additionally, a relative position of the robot 300 with respect to the i-numbered first place may be calculated using a relative position of the i-numbered first place. For example, the relative position of the robot 300 with respect to the i-numbered first place may be an inverse value of the relative position of the i-numbered first place.

In an embodiment, the i-numbered corrected position may be expressed as the following formula 1.

$$^{e}X_{r\_i} = {^{e}X_{l\_i}} \oplus {^{l}X_{r\_i}} \quad \text{[Formula 1]}$$

In the formula, $^{e}X_{r\_i}$ denotes the i-numbered corrected position, $^{e}X_{l\_i}$ denotes the position of the i-numbered second place, $^{l}X_{r\_i}$ denotes the relative position of the robot 300 with respect to the i-numbered first place, and $\oplus$ denotes a compound operator.

A weighted sum of the N the corrected positions may be expressed as the following formula 2.

$$^{e}X_{r} = \sum_{i=1}^{N} w_{i} \times {^{e}X_{r\_i}} \quad \text{[Formula 2]}$$

In the formula, $w_i$ denotes a weight corresponding to the i-numbered corrected position, i.e., an i-numbered weight.

In an embodiment, the i-numbered weight may be set in inverse proportion to a distance between the i-numbered first place and the robot 300, and in inverse proportion to an angle of the i-numbered first place (e.g., an angle of a sign structure of the i-numbered first place) seen from the robot 300.

A weighted sum of the N corrected positions is almost the same as an actual position of the robot 300. Additionally, at the time point when the weighted sum of the N corrected positions is calculated, the processor 370 determines that the calculated weighted sum of the N corrected positions is the position of the robot 300. At a time point after the weighted sum of the N corrected positions is calculated, the processor 370 may correct the measured position of the robot 300 using the calculated weighted sum of the N corrected positions.

In summary, the present disclosure registers information on an adjacent major place applied in a web map on a map of the robot 300 and, when the robot 300 finds out the major place, corrects a position of the robot 300 using the registered place information.

When all elements of the embodiments of the present disclosure are described to be combined into one element or to operate in combination, the disclosure is not limited to the embodiments and all the elements may be selectively combined to operate within the scope of the disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the present disclosure can be realized. Examples of a storage medium having stored the computer program include storage mediums such as a magnetic recording medium, an optical recording medium, and a semiconductor recording medium. The computer program for realizing the embodiments of the disclosure includes a program module which is transmitted via an external device in real time.

While embodiments of the present disclosure are described above with reference to the accompanying drawings, it will be apparent that the present disclosure should not be construed as being limited to the embodiments and drawings set forth herein, and that various changes or modifications can be made by those skilled in the art within the technical spirit of the disclosure. Further, though not explicitly described during description of the embodiments of the disclosure, predictable effects according to the configuration of the disclosure should be included in the scope of the disclosure.

What is claimed is:

1. A robot, comprising:
a position measuring sensor configured to measure a position of the robot as the robot moves in an outdoor space;
a camera configured to acquire an image of surroundings of the robot;
a memory configured to store place information including positions and appearance feature information of a plurality of places existing in the outdoor space; and
at least one processor configured to:
extract one or more appearance features of M first places in the image, where M is an integer greater than or equal to 1,
select one or more positions of N second places from the place information stored in the memory based on the one or more appearance features of the M first places in the image, where N is an integer greater than or equal to 1 and less than or equal to M, and
generate a corrected position for the robot based on the position measured by the position measuring sensor and the one or more positions of the N second places selected from the place information.

2. The robot of claim 1, wherein the at least one processor is further configured to:
select a group of one or more second places adjacent to the position of the robot from among the plurality of places, and
select the N second places based on comparing one or more appearance features of the one or more second places in the group with the one or more appearance features of the M first places.

3. The robot of claim 1, wherein the at least one processor is further configured to:
extract the one or more appearance features of the M first places based on an artificial neural network-based algorithm model,
wherein the algorithm model includes an input layer comprised of input nodes, an output layer comprised of output nodes, and one or more hidden layers placed between the input layer and the output layer and comprised of hidden nodes, and weights of edges connecting the nodes and biases of the nodes are updated through learning.

4. The robot of claim 3, further comprising:
a learning processor configured to learn the algorithm model based on a picture including an exterior of a place existing in the outdoor space,
wherein the picture is extracted from a first web map comprised of pictures, as training data.

5. The robot of claim 3, wherein the image is input to the input layer of the algorithm model, and the one or more appearance features of the M first places are output to the output layer of the algorithm model.

6. The robot of claim 1, where the appearance feature corresponds to store-name information displayed in a structure placed near at least one of the M first places.

7. The robot of claim 6, wherein the place information is generated based on a second web map including the positions and pieces of store-name information of the plurality of places in the outdoor space.

8. The robot of claim 6, further comprising:
a depth sensor configured to acquire depth data corresponding to the image,
wherein the appearance feature corresponds to store-name information displayed in a sign structure placed near to one of the plurality of places,
wherein the processor is further configured to:
detect central portions of sign structures of the M first places by analyzing the image, and
calculate relative positions of the central portions of the sign structures of the M first places with respect to the robot based on the depth data, and
wherein the relative positions of the central portions of the sign structures of the M first places correspond to relative positions of the M first places.

9. The robot of claim 8, wherein the at least one processor is further configured to:
calculate edges of the sign structures of the M first places,
calculate vanishing points corresponding to the sign structures of the M first places based on the edges,
calculate relative angles of the sign structures of the M first places with respect to the robot based on the vanishing points, and
calculate the relative positions based on the relative angles.

10. The robot of claim 1, wherein the at least one processor is further configured to:
calculate relative positions of N first places among the M first places with respect to the robot based on the image, and
generate the corrected position based on the relative positions of the N first places and the positions of the N second places,
wherein the N second places has a same appearance feature as the N first places.

11. The robot of claim 10, wherein the at least one processor is further configured to:
calculate N corrected positions, and correct the position of the robot measured by the position measuring sensor based on a weighted sum of the N corrected positions,
wherein an i-numbered corrected position among the N corrected positions is calculated based on a relative position of the robot with respect to a position of an i-numbered second place among the N second places and with respect to an i-numbered first place among the N first places, where i is an integer greater than or equal to 1, and
wherein the relative position of the robot with respect to the i-numbered first place is calculated using a relative position of the i-numbered first place.

12. The robot of claim 11, wherein a weight corresponding to the i-numbered corrected position is set in inverse proportion to a distance between the i-numbered first place and the robot and in inverse proportion to an angle of the i-numbered first place seen from the robot.

13. The robot of claim 1, wherein the position measured by the position measuring sensor is defined by a latitude and a longitude, and
wherein the position measuring sensor corresponds to a Global Positioning System (GPS) sensor or a Global Navigation Satellite System (GLONASS) sensor.

14. A robot, comprising:
a position measuring sensor configured to measure a position of the robot in an outdoor space;
a camera configured to capture an image of surroundings of the robot;

a memory configured to store one or more instructions; and at least one processor, executing the one or more instructions, configured to:
- extract an appearance feature of a first place in the image,
- select a position of a second place having an appearance feature same as the appearance feature of the first place from pre-acquired place information, and
- generate a corrected position for the robot based the position measured by the position measuring sensor and the position of the second place, wherein the pre-acquired place information includes positions and appearance features for a plurality of places existing in the outdoor space.

15. A method for correcting a position of a robot, the method comprising:
- measuring, by a position measuring sensor in the robot, the position of the robot in an outdoor space;
- capturing, by a camera in the robot, an image of a surrounding environment of the robot;
- extracting, by a processor in the robot, appearance features of M first places in the image, where M is an integer greater than or equal to 1;
- selecting, by the processor, positions of N second places having appearance features corresponding to at least a part of the appearance features of the M first places based on pre-acquired place information for the N second places, where N is an integer greater than or equal to 1 and less than or equal to M; and
- generating, by the processor, a corrected position for the robot based on the position measured by the position measuring sensor and at least one of the positions of the N second places, wherein the pre-acquired place information includes positions and appearance features of a plurality of places existing in the outdoor space.

16. The method of claim 15, wherein the selecting includes:
- selecting a group of the one or more second places adjacent to the position of the robot from among the plurality of places included in the pre-acquired place information; and
- selecting the N second places based on comparing one or more appearance features of the one or more second places in the group with one or more appearance features of the M first places.

17. The method of claim 15, wherein the extracting includes:
- extracting the one or more appearance features of the M first places based on an artificial neural network-based algorithm model,
- wherein the algorithm model includes an input layer comprised of input nodes, an output layer comprised of output nodes, and one or more hidden layers placed between the input layer and the output layer and comprised of hidden nodes, and weights of edges connecting the nodes and biases of the nodes are updated through learning.

18. The method of claim 17, wherein the algorithm model is learned based on a picture including an exterior of a place existing in the outdoor space, and
wherein the picture is extracted from a first web map comprised of pictures, as training data.

19. The method of claim 15, wherein the appearance features corresponds to store-name information displayed in a structure placed near at least one of the plurality of places.

20. The method of claim 15, wherein the pre-acquired place information is generated based on a second web map including the positions and pieces of store-name information of the plurality of places in the outdoor space.

* * * * *